United States Patent [19]

Arvidsson et al.

[11] Patent Number: 4,470,578
[45] Date of Patent: Sep. 11, 1984

[54] LOAD TRANSFER DEVICE

[75] Inventors: Lars I. Arvidsson, Västra Frölunda; Stig T. Jönegren, Stenungsund, both of Sweden

[73] Assignee: Idux Industriell Exploatering Aktiebolag, Sweden

[21] Appl. No.: 25,567

[22] Filed: Mar. 30, 1979

[51] Int. Cl.³ .............................................. B60P 1/00
[52] U.S. Cl. .............................. 254/2 C; 254/93 HP; 180/125; 180/128; 180/124; 414/498
[58] Field of Search ................ 254/93 HP, 2 R, 2 B, 254/2 C; 414/498; 180/116, 124–125, 127–128

[56] References Cited

U.S. PATENT DOCUMENTS 3,010,698  11/1961  Allen et al. ............... 254/93 HP
3,267,882  8/1966   Rapson et al. ............ 180/124
3,796,279  3/1974   Burdick et al. ........... 180/124

Primary Examiner—Robert C. Watson
Attorney, Agent, or Firm—Harness, Dickey & Pierce

[57] ABSTRACT

The invention concerns a load transfer device with a platform which is insertable below and movable with a load and equipped with a number of at least in one row below the platform arranged lifting means for elevating and lowering of the platform. For enabling the transfer device together with its load to be moved from a base, e.g. a floor, to another base, e.g. a loading platform, situated at a lower or higher level the lifting means are capable in each row individually or in groups alternatively of varying the distance between the base in question and the platform of the transfer device, whereas the latter is provided with feeling means which are capable of connecting the lifting means to a source of energy when the lifting means in question reaches a base situated on a lower level and of disconnecting this lifting means from the source of energy when said lifting means reaches a base on a higher level.

5 Claims, 15 Drawing Figures

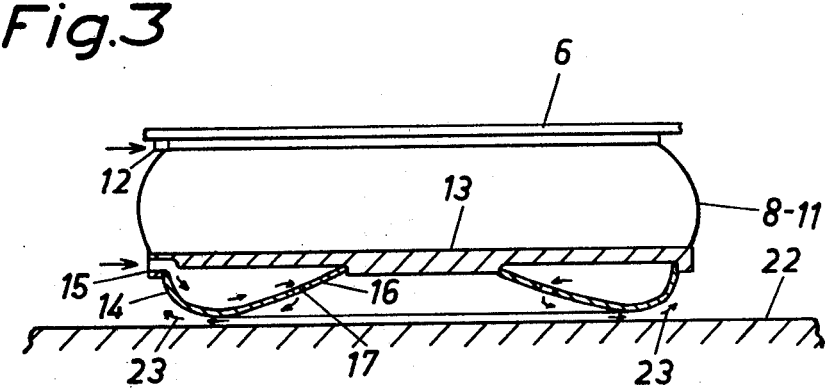
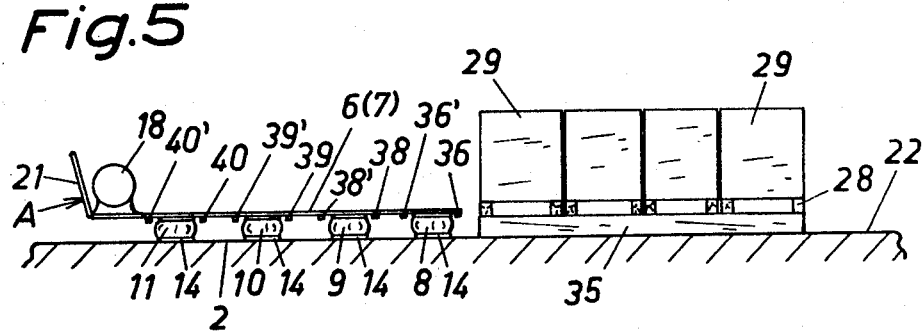
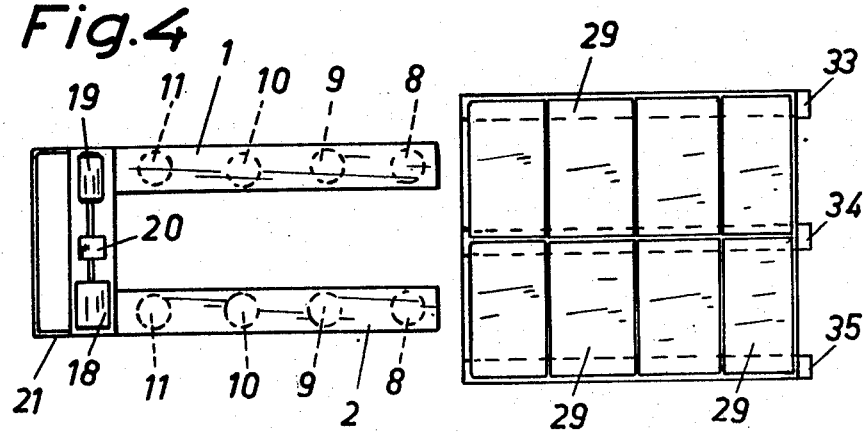

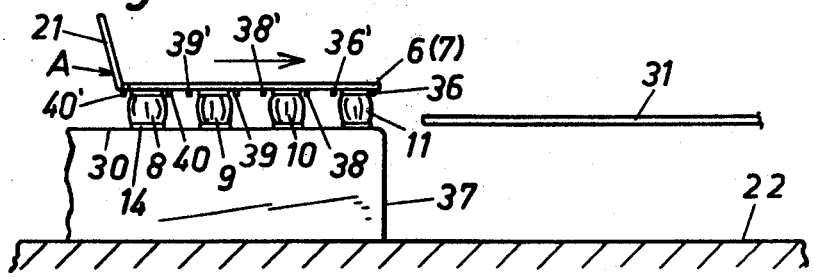
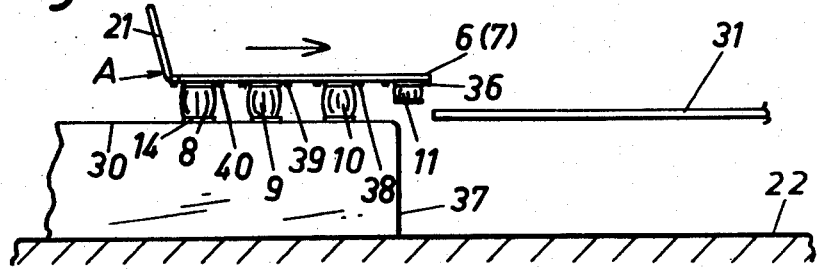
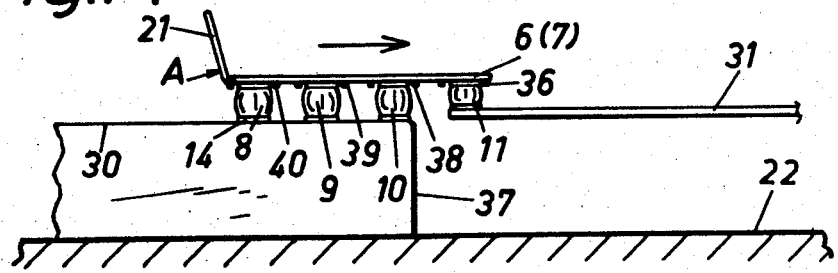
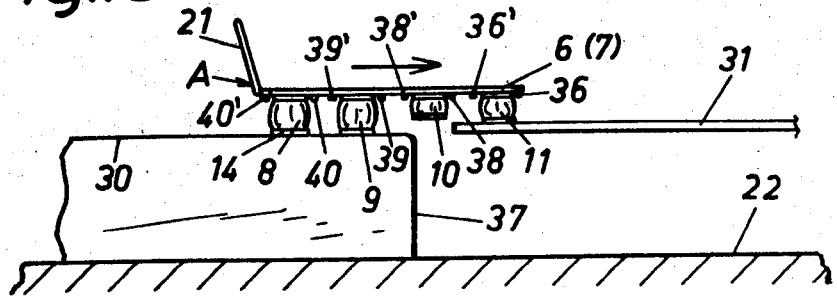

LOAD TRANSFER DEVICE

BACKGROUND OF THE INVENTION

When loading and unloading of vehicles the stand-still periods should of course be as low as possible. This is achievable by making the load to be handled big because the number of handling cycles then will be low.

The subject invention concerns a load transfer device by means of which the stand-still periods during loading and unloading can be made very short. Especially the invention concerns such loading devices that are provided with a load carrying platform which is insertable below and movable with a load and equipped with a number of at least in one row below the platform arranged lifting means for elevating and lowering of the platform.

SUMMARY OF THE INVENTION

One object of the invention is to make it possible by means of a transfer device of this kind to move a load from one level to a higher or lower one, e.g. from a store house loading platform to the platform of a lorry and further from this platform to a platform situated at a higher or lower level than the first one, whereby during movement of the transfer device its load platform forms a support for the load. This is achieved by a device according to the subject invention thereby that the lifting means are capable in each row individually or in groups alternatively of varying the distance between a base, e.g. a floor, and the platform and that the latter is provided with feeling means which are capable of connecting the lifting means to a source of energy when the lifting means in question reaches a base situated on a lower level and of disconnecting this lifting means from the source of energy when said lifting means reaches a base on a higher level.

Another object of the invention is to facilitate the movement of the load transfer device on a floor. According to the invention the friction between the lifting means and the floor is reduced when beneath each of the lifting means is arranged a compressed air cushion known per se, connectable to a source of compressed air, and capable of letting compressed air from the interior of the air cushion out between the latter and the floor whereby a frictionless air film is created underneath each cushion.

BRIEF DESCRIPTION OF THE DRAWINGS

Further characteristics of the invention will appear from the following description with reference to the accompanying, partly schematic drawings, wherein FIG. 4 is a plan view of a load consisting of eight load pallets for being moved by means of the transfer device in one single operation, FIG. 5 is a side view of this load and of the transfer device.

DETAILED DESCRIPTION OF A PREFERRED EMBODIMENT

Figure 2:
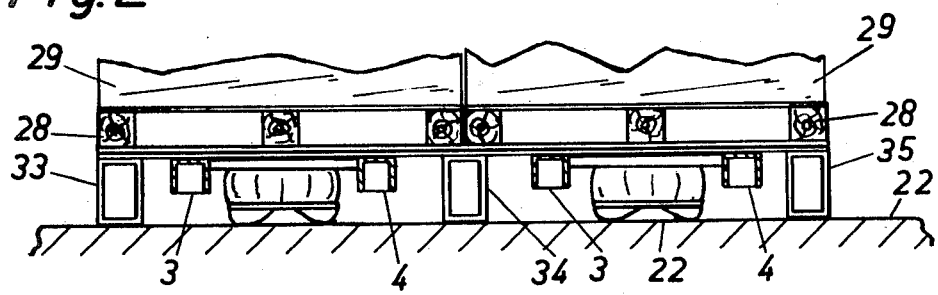
Figure 1:
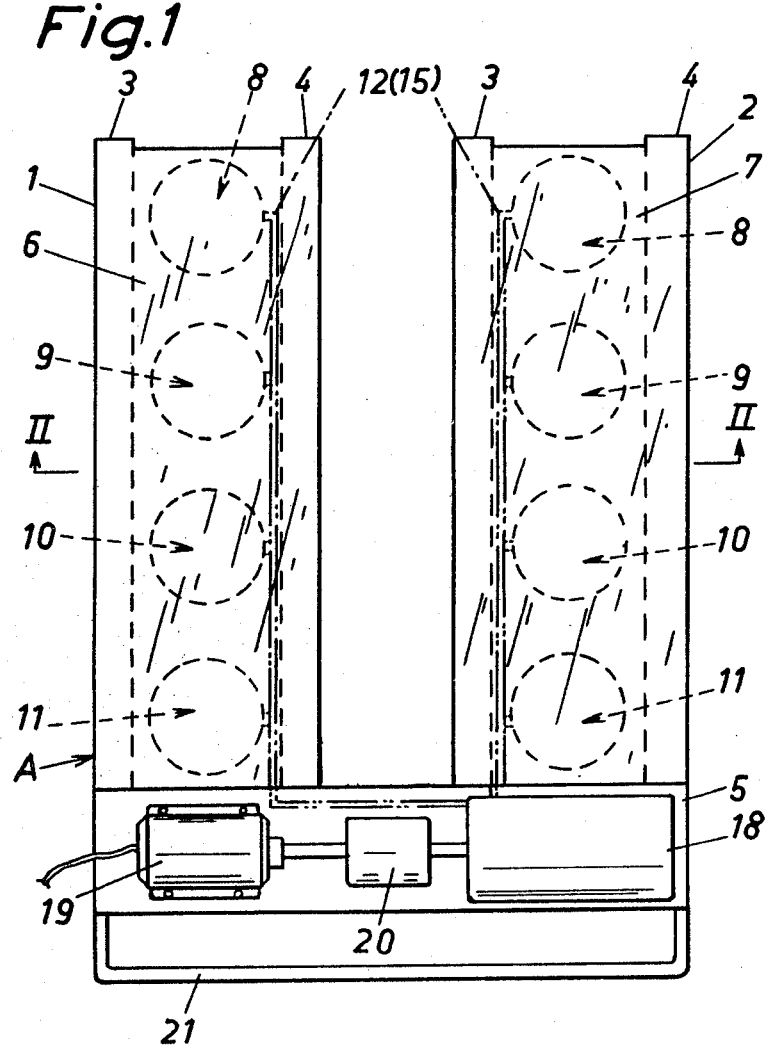
FIG. 1 is a plan view of a load transfer device according to the subject invention, FIG. 2 a vertical cross section along the lines II—II in FIG. 1, FIG. 3 discloses in a bigger scale a vertical cross section through one of the lifting means of the transfer device in an active position.

The load transfer device disclosed in the drawings has two parallel legs 1, 2 in the form of beams 3, 4 which are joined at their one end by a cross bridge 5. The beams are in pairs connected to a carrying plate 6, 7. Below each carrying plate 6, 7 is arranged a row of lifting means 8, 9, 10, and 11.

According to the embodiment disclosed in FIG. 3 each lifting means 8–11 incl. comprises a bellow of rubber or a similar elastic material, which bellow is via a hose, tube or the like 12 connectable to a source of compressed air. The bellows 8–11 are each provided with a base plate 13 at the under side of which is fixed a torus-formed, inflatable membrane 14 which via a hose, tube or the like 15 is connectable to a source of compressed air. The membrane 14 which serves as an air cushion has its inwards turned part 16 provided with small holes 17 through which a part of the compressed air within the membrane will be pressed out.

Compressed air to the bellows 8–11 and to the air cushions 14 can be obtained from a compressor on the bridge 5 and driven by an electro motor 19 via a gear box 20. By means of a horizontal handle 21 the load transfer device can be moved on a base, e.g. a floor 22. The movement, in any direction, is achieved easily thereby that air is pressed out through the holes 17 in the central part of the cushion 14 and further along the arrows 23 in FIG. 3 between the air cushion and the floor 22. The movement thus takes place on a frictionless air film.

Between the compressor 18 and the bellows 8–11, resp. their air cushions 14 are in the conducts 12 and 15 mounted valves (not shown) which are controlled by sensing means 24, 25, 26, and 27. The latter can be of a mechanical or electrical type which is adapted to sense the distance between themselves and an associated surface.

In FIGS. 6–11 is shown a load transfer device A in which the conducts 12 and 15 to the bellows 8–11 and their air cushions 14 are connected to a stationary compressed air source (not shown) by means of hoses.

The bellows 8 and 11 are supposed to be connected to each other so that they are in common supplied with compressed air resp. are cut off from the compressed air source. The same applies to the bellows 9 and 10. When the bellows are disconnected from the pressure source, their bottom plate 13 is elevated, e.g. by means of springs (not shown), towards its carrying plate 6, 7.

The object of the bellows is to make a movement of loads from one base surface to another possible the latter situated on a higher or lower level, whereas the air cushions 14 due to the air film created between the said base surface and the air cushions make it possible to move heavy loads manually or mechanically with a very small pulling force.

Figure 6:
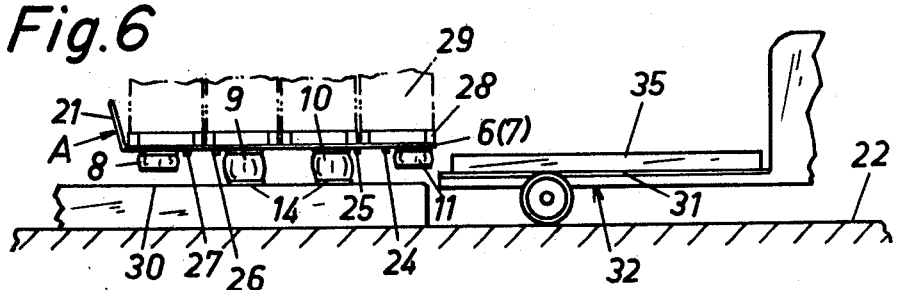
FIGS. 6, 7, and 8 are side views, showing a load transfer device according to a somewhat simplyfied embodiment of the invention, FIGS. 9, 10, and 11 disclose in the same way the unloading of the vehicle, and FIGS. 12, 13, 14, and 15 disclose schematically the working principle for individually compressed air controlled lifting means on the load transfer device.
Figure 7:
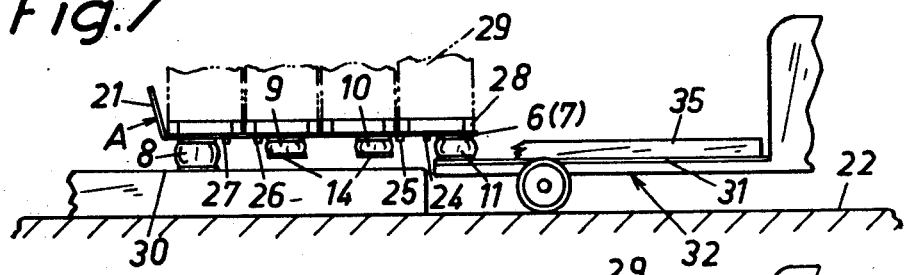
Figure 8:
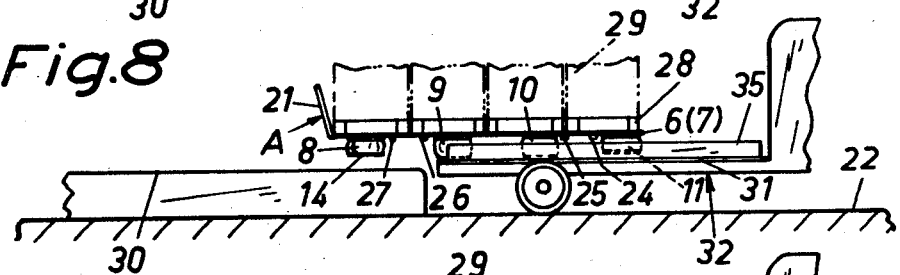

With reference to FIGS. 6–8 incl. will be declared how a load 29 supported on pallets 28 by means of a transfer device A can be moved from a store house (not shown) via a loading bridge 30 to a platform 31 of a lorry 32 situated on a higher level than the store house floor. After having made all bellows 8–11 pressureless, which means that the transfer device A with its carrying plates 6, 7 is in its lowermost position, the transfer device is moved in under the load pallets 28. The bellows 9 and 10 are then supplied with pressure and elevates the load 28, 29 whereafter it, e.g. manually, is moved to the loading platform 30 and to the lorry 32 waiting there. When the bellow 11 reaches the rear edge of the lorry platform 31, the sensing means 24 gives an impuls and opens the valves to the bellows 8 and 11 in which then pressure is supplied. The carrying plates 6, 7 remain their horizontal situation due to the fact that the pressure in the bellows is controlled by means of level controlling valves (not shown). Instantly the bellows 9 and 10 are made pressureless and their air cushions are elevated to an ineffective position. The load is now moved further, carried only by the bellows 8 and 11, in over the lorry platform 31 until the bellows 9 and 10 are situated over this platform. The sensing means 26 now ensures that the bellows 9 and 10 are supplied with pressure and that the bellows 8 and 11 are made pressureless.

In the same way a second and eventually a third load unit is transferred from the store house onto the lorry platform 31.

Figure 9:
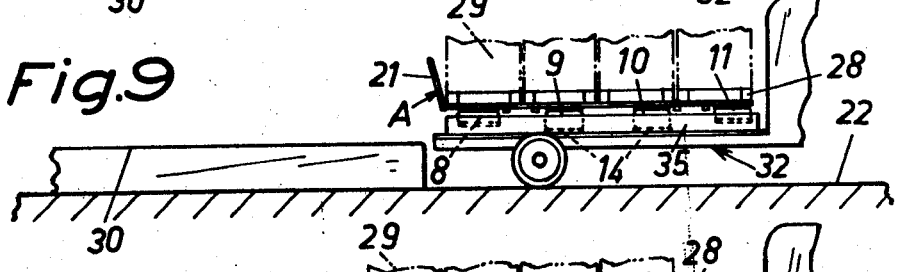
Figure 10:
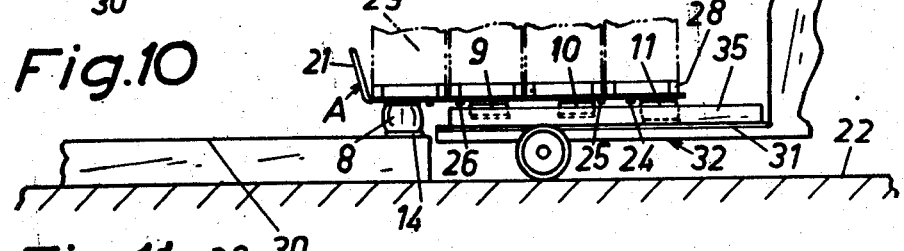
Figure 11:
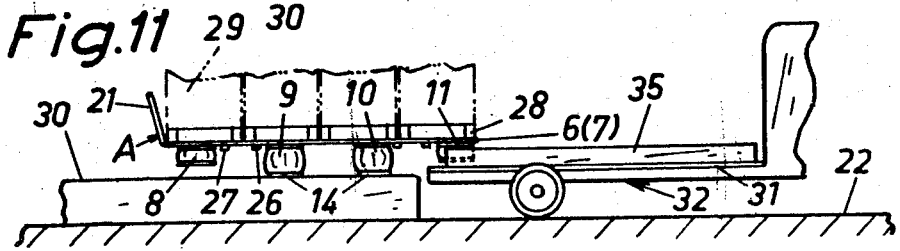

In FIGS. 9–11 is shown how in the opposite direction the unloading of the goods from the lorry platform 31 to the loading platform 30 is performed by means of a load transfer device A according to the invention. After a load 29 carried by the pallet 28 has been lifted by means of the transfer device A by way of the bellows 9, 10 having been supplied with pressure, the device is moved so that the bellow 8 is situated over the loading platfrom 30. The sensing means 27 causes the bellows 8 and 11 to be pressurized and that the bellows 9 and 10 at the same time are made pressureless (FIG. 10). The transfer device A is moved further to the left, till the bellow 10 is situated over the loading platform 30, when the sensing means 25 causes the bellows 9 and 10 to be pressurized and the bellows 8 and 11 to be pressureless. After the whole transfer device A has been moved up onto the loading platform 30, can by means of another sensing means (not shown) also the bellows 8 and 11 as well as their air cushions be pressurized so that the whole device A can be comfortably pulled or pushed into the store house.

In FIGS. 12–15 is shown how the bellows 8–11 of a transfer device A according to the invention are activated in which the bellows are individually pressure controlled. When the transfer device A arrives at the loading platform 30, all air cushions 14 and bellows 8–11 are activated, i.e. are completely or only partly expanded by compressed air. At the movement of the transfer device A in direction of the lorry platform 31 at first the sensing means 36 sences (feels) the edge 37 of the loading platform 30. The sensing means 36 gives an impuls to the control system for emptying of the bellow 11 and disconnecting of the supply of compressed air to its air cushion 14. After the sensing means 36' has sensed and passed over the edge of the lorry platform 31, the bellow 11 and its air cushion 14 (FIG. 14) are again activated. In the same way the giving of impulses and the controlling of the following bellows 10, 9, and 8 as well as their air cushions 14 are then performed by the respective sensing means 38, 38', 39, 39', 40, and 40', until the transfer device A has arrived at the loading platform 31 with all air cushions 14 and bellows 8–11 activated.

At the movement of the transfer device A from the loading platform 31 the control of the supply of compressed air to and from the bellows and their air cushions is performed in the same way but in reverse direction compared with that described above.

The embodiments as described and illustrated herein are to be regarded as examples, only, and the number of bellows 8–11 at each leg 1, 2 of the transfer device A as well as the number of legs is independent of the invention. Instead of with compressed air driven bellows 8–11 mechanical lifting means, e.g. a Nuremberger scissors, may be used. Also other friction reducing means than air cushions 14 may be used for facilitating the movement of the transfer device A on the floor 22. Compressed air may be replaced by a fluid, e.g. water.

The load pallets 28 may be replaced by one big pallet which carries the whole load 29 and is provided with longitudinal beams 33, 34, 35 in between the legs 1, 2 of the transfer device A can pass. A pallet can be dispensed with if the load is self-carrying, e.g. when the load is piled in a special manner and is wrapped in a plastics film.

For propelling the transfer device A it may be equipped with a motor, e.g. air motor driven friction driving wheels. The unit 18, 19, 20 may be dispensed with if the bellows 8–11 and their air cushions 14 are connected to a stationary source of compressed air by means of hoses.

The air cushions 14 may be replaced by running wheels and the bellows 8–11 by mechanical lifting and lowering devices, e.g. hydraulically driven Nuremberger scissors.

The transfer device A may be provided with means for its interconnection with a truck, e.g. a fork-lift truck, in order to facilitate its movement.

What we claim is:

1. A load transfer device comprising a platform which is insertable below and engageable with a load, a plurality of lifting means cooperable with said platform for elevating and lowering of said platform, at least certain of said lifting means being capable of varying the distance between a base, supporting said transfer device and said platform independently of other of said lifting means, and said platform being provided with sensing means for connecting said lifting means to a source of energy when the lifting means in question reaches a base situated on a lower level and for disconnecting this lifting means from said source of energy when said lifting means reaches a base on a higher level.

2. A load transfer device according to claim 1, said lifting means consisting of bellows and the source of energy comprises a source of compressed air.

3. A load transfer device according to claim 2, further including a compressed air cushion beneath each of the lifting means, said cushions each being connectable to a source of compressed air and capable of letting compressed air from the interior of said air cushion out between the latter and the base supporting the transfer device in order to facilitate the movement of said device on said base due to a film of escaping air beneath said cushion.

4. A load transfer device according to claim 1, wherein said platform comprises at least two beams joined at one of their ends, at least three lifting means positioned beneath each beam.

5. A load transfer device according to claim 1, wherein said lifting means comprises mechanical devices.

* * * * *